United States Patent
Picou (10) Patent No.: US 11,097,244 B2
(45) Date of Patent: Aug. 24, 2021

(54) DYNAMIC TUNING LOGIC FOR PETROLEUM PROCESSING AND CHEMICAL PRODUCTION

(71) Applicant: ExxonMobil Research and Engineering Company, Annandale, NJ (US)

(72) Inventor: Douglas J. Picou, Baton Rouge, LA (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 904 days.

(21) Appl. No.: 15/584,352

(22) Filed: May 2, 2017

(65) Prior Publication Data
US 2017/0348664 A1   Dec. 7, 2017

Related U.S. Application Data

(60) Provisional application No. 62/344,442, filed on Jun. 2, 2016.

(51) Int. Cl.
B01J 19/00       (2006.01)
G05B 6/02       (2006.01)

(52) U.S. Cl.
CPC .......... *B01J 19/0006* (2013.01); *G05B 6/02* (2013.01); *B01J 2219/00049* (2013.01)

(58) Field of Classification Search
CPC ........ B01J 2219/00049; B01J 19/0006; G05B 6/02
See application file for complete search history.

(56) References Cited

U.S. PATENT DOCUMENTS

| 9,098,093 B2* | 8/2015 | Macharia ........... G06Q 30/0283 |
| 2008/0103747 A1* | 5/2008 | Macharia ............. G05B 13/048 703/11 |
| 2008/0103748 A1* | 5/2008 | Axelrud ................. G05B 13/04 703/12 |

* cited by examiner

*Primary Examiner* — Shogo Sasaki
(74) *Attorney, Agent, or Firm* — Glenn T. Barrett (57) ABSTRACT

Systems and methods are provided for controlling chemical production and/or petroleum processing reaction systems to allow for improved control of control variables relative to desired set points. The improved control can be achieved by use of a modified proportional-integral-derivative (PID) controller or a similar type of controller that includes dynamic tuning logic. The modified PID controller can be operated using different coefficients based on the relative values of a control variable and a reasonable progress curve determined based on the values of the control variable.

20 Claims, 7 Drawing Sheets

DYNAMIC TUNING LOGIC FOR PETROLEUM PROCESSING AND CHEMICAL PRODUCTION

CROSS-REFERENCE TO RELATED APPLICATIONS

This application claims priority to U.S. Provisional Application Ser. No. 62/344,442 filed Jun. 2, 2016, which is herein incorporated by reference in its entirety.

FIELD

Systems and methods are provided for improving process control in petroleum processing and/or chemical production.

BACKGROUND

Processes for separation and refining of crude oil fractions and processes for chemical production can typically involve maintaining control over a variety of variables for a given process. In such processes, process controllers such as proportional-integral-derivative (PID) controllers are often used to allow for automated adjustment of manipulated variables in response to changes in one or more measured or control variables. Conventional use of PID controllers can improve process control, but further improvements in maintaining control variables at target values are desirable.

SUMMARY

In an aspect, a method is provided for controlling a process using a process controller. The method can include performing a chemical production process or petroleum refining process at conditions comprising a value for a control variable. The control variable can have an associated process controller and a corresponding manipulated variable. A first value of the control variable different from a set point value can be detected at a first point in time. A reasonable progress curve value can be calculated for a second point in time based on the detected first value of the control variable. A second value of the control variable can be detected at the second point in time. A difference between the detected second value of the control variable and the set point value can be greater than a difference between the reasonable progress curve value for the second point in time and the set point value. A first set of operating coefficients can then be selected for the process controller based on the detected second value of the control variable. The first set of operating coefficients can include a first integral coefficient for providing a first weighting for an integral term of the process controller. The process controller can then be operated to modify the corresponding manipulated variable, the process controller being operated using the selected first set of operating coefficients.

In another aspect, a process control system, a process control system is provided. The process control system can include a detector for detection of a control variable. The process control system can further include an actuator, electrical activator, second process controller, or combination thereof for modifying a manipulated variable. The process control system can additionally include a first process controller in communication with the detector to receive detected values of the control variable and in communication with the actuator, electrical activator, second process controller, or combination thereof to provide a controller output for control of the manipulated variable. Optionally, the first process controller can comprise a processor having an associated memory containing executable instructions that, when executed, provide a method for controlling the manipulated variable as described above.

In still another aspect, a process controller is provided. The process controller can include a proportional-integral control module for receiving detected values of a control variable and generating a controller output for control of a manipulated variable. The process controller can further include a curve calculation module for determining a reasonable progress curve based on detected values of the control variable. The process controller can additionally include a coefficient storage module for providing coefficients to the proportional-integral control module based on a detected value of the control variable and a reasonable progress curve value.

DETAILED DESCRIPTION

Overview

In various aspects, systems and methods are provided for controlling chemical production and/or petroleum processing reaction systems to allow for improved control of control variables relative to desired set points. The improved control can be achieved by use of a modified proportional-integral-derivative (PID) controller or a similar type of controller. The modified PID controller can have different responses to several types of behavior in a measured or control variable.

As an illustration, a hypothetical control variable can be considered that has an associated set point (i.e., target value) and an associated set of error bands on either side of the associated set point. When the control variable is outside of the set of error bands and either diverging from the set point or returning to set point at less than a desired rate, the controller can operate with a first set of operating coefficients. The first set of operating coefficients can include an integral coefficient that determines a relative contribution from the integral term for control of a manipulated variable. In other words, the weighting for the integral term relative to the weighting for the proportional term of the controller can be defined based on the first set of coefficients.

If the control variable is outside of the set of error bands and returning to set point with at least a desired rate of progress, as possibly represented by a reasonable progress curve, the process controller can be operated using a second set of operating coefficients. For this second set of operating conditions, the integral term can have a lower weighting (smaller in magnitude) in comparison with the weighting of the integral term in the first set of coefficients. Thus, even though the control variable may be far from the set point (i.e., outside of a first set of error bands), if the control variable is returning to the set point at a desired rate, the contribution of the integral term can be reduced so that the desirable rate of progress is maintained. This is in contrast to a conventional controller, where the integral term can have a larger contribution when the control variable is far from the set point regardless of the rate of progress.

If the control variable is within the first set of error bands, the behavior of the controller can be dependent on whether dynamic tuning logic is also used for the region closer to the set point. If dynamic tuning logic is not used, a third set of operating coefficients can be used when the control variable is within the first set of error bands. If dynamic tuning logic is being used, then comparison with a reasonable progress curve can determine whether a third set of coefficients or a fourth set of coefficients is used.

The above describes the ability to use dynamic tuning logic to select the operating coefficients for a controller, so that the operating coefficients are selected at least in part based on the rate of progress of the control variable in returning to set point. Using dynamic tuning logic that can account for progress toward a desired set point can reduce or minimize difficulties associated with the process controller "overshooting" and leading to divergence from the set point in the opposite direction. It is noted that in the above hypothetical, one or more additional sets of error bands beyond the first set of error bands could be used. Each additional set of error bands can define an additional region that may or may not implement dynamic tuning logic. The definition for a reasonable progress curve and/or the coefficients can be independently selected for each additional region.

Processes in a refinery and/or chemical production setting can pose a variety of challenges when using process controllers in an effort to automatically maintain control variables at a desired set point. In some processes, the challenges can relate to a long lag time between a change in a manipulated variable and the impact on a measured or control variable. For example, for a polymer synthesis reaction system or a hydroprocessing reactor, the volume of the reactor can be substantial relative to the rate of fluid flow into and out of the reactor. For these types of reactors, if a control variable such as temperature diverges from a desired set point, the relatively large volume of the reactor may make it difficult for a change in a manipulated variable to have a short term impact in causing the control variable to converge toward the set point. Instead, the control variable may continue to diverge for a period of time, even though a suitable change in the corresponding manipulated variable has already been made. This lag between change in manipulated variable and detection of a response in the measured or control variable can lead to overcorrection. When overcorrection occurs, a control variable that is greater than/less than a set point value can be corrected to the point where it diverges from the set point by being less than/greater than the set point value. In some situations, overcorrection can occur repeatedly, leading to unstable operation with large swings of the control variable around the desired set point. Alternatively, setting the parameters for a controller to avoid overcorrection can result in control variables remaining unacceptably far from set point for extended periods of time.

In some aspects, a control variable that is diverging from a set point (i.e., the difference between the control variable and the set point is increasing) can have a long lag time between a) the time a change is introduced into a manipulated variable by a corresponding process controller, and b) the time when a sufficient change in the control variable occurs due to the controlled variable so that the control variable starts to converge toward the set point. Typically, the change in the controlled variable can be introduced by the process controller in response to detecting the divergence of the control variable from the set point. In such aspects, the time lag between the time of the initial change in the controlled variable in response to divergence of the control variable from the set point (and/or divergence beyond a specified error band) and the time when the control variable starts to converge toward the set point can be at least about 5 minutes, or at least about 15 minutes, or at least about 30 minutes, or at least about 1 hour, or at least about 2 hours, such as up to about 5 hours or more. In such aspects with long time lag between detection of divergence of a control variable and correction by the process controller, use of dynamic tuning logic as described herein can reduce or minimize the amount of overshoot by the control variable. In particular, dynamic tuning logic can allow the coefficients for the process controller to be selected based on whether a defined amount of reasonable progress toward set point is occurring, as opposed to selecting coefficients based only on the distance of the control variable from the set point.

Another potential difficulty with implementing process controllers can arise in situations where tight control of a control variable relative to a set point is desired. For example, in a reboiler for an atmospheric or vacuum distillation tower, a control variable can be the liquid level in a tower reboiler relative to the height of the heating coils for the reboiler. Maintaining too large a reservoir of oil can make it difficult to efficiently return lower boiling compounds to the tower, while too small a reservoir can cause the coils to become exposed, potentially leading to temperature spikes and undesired cracking of feed. As a result, it can be desirable to control the liquid level in the reboiler within a tight range. Conventional operation of a controller to maintain a tight range can lead to aggressive adjustment of the manipulated variable when a control variable diverges from the set point. However, similar to the long lag time situation described above, this can lead to overcorrection. In various aspects, dynamic tuning logic can assist with reducing or minimizing this source of overcorrection.

Still another potential difficulty can occur in processes where multiple control variables have corresponding manipulated variables, with the control variables having at least an indirect relationship to each other. In this situation, when an unusual event occurs, multiple control variables may diverge from their set points. In response, each of the controllers for the control variables may make changes in the corresponding manipulated variables. The net result of the operation of the plurality of controllers may lead to overcorrection due to the cumulative effect of the change in each manipulated variable. As noted above, this can potentially lead to swings in control variables around the desired operation point when an initial overcorrection leads to a response that causes a second overcorrection. In various aspects, dynamic tuning logic can assist with reducing or minimizing this source of overcorrection.

In various aspects, one or more of above difficulties can be addressed by using a proportional-integral process controller (such as a proportional-integral-derivative process controller) that is modified to have a different integral coefficient and/or different gain (such as different gain coefficient) based on whether a reasonable progress curve is being satisfied. This is in contrast to operating a process controller to have an integral coefficient that is fixed or that is dependent only on the distance of the control variable from the set point. It is noted that selecting the integral coefficient can include setting the integral coefficient so that the integral term has a minimized contribution when the control variable is returning to the set point at a rate that satisfies the reasonable progress curve.

Proportional-Integral-Derivative Controllers

Proportional-Integral-Derivative (PID) controllers are commonly used as process controllers for modifying a manipulated variable in response to a control variable. In this discussion, it is understood that references to a PID controller also include proportional-integral (PI) controllers that operate using only a proportional term and an integral term. Such process controllers can be dedicated PI controllers and/or or PID controllers where the coefficient for the derivative term is set so that the derivative provides no contribution/a minimized contribution to the controller.

During operation, a PID controller can potentially use three separate terms to determine how to modify a manipulated variable. Each of the separate terms can have an associated coefficient that defines a relative weighting for the term in calculating a controller output signal. A first term can correspond to a "proportional" term. A proportional term represents a term that modifies the value of a manipulated variable by an amount that is proportional to the difference between a control variable and a set point. An example of a proportional term is multiplying the difference between a control variable and a set point by a coefficient.

A second term can correspond to an "integral" term. An integral term can correspond to a term that is proportional to an integral or an average accumulation of the distance of the control variable from a set point over a period of time. When a control variable deviates from a set point for a short period of time, an integral term can appear to behave in a similar manner to a proportional term. However, as the length of time of a deviation from set point continues, the integral term can increase in value. This increase in value may be in spite of the fact that the control variable has started to return toward the set point value.

A third term can correspond to a "derivative" term. A derivative term can correspond to a term that is proportional to the rate of change of a control variable. The derivative term for a PID controller is often given no weight and/or a minimized weight due to potential instability that can occur when attempting to give the derivative term a meaningful weight.

One conventional modification to the use of the above terms can be to have different coefficients for the proportional, integral, and/or derivative terms depending on the distance of the control variable from the set point. This can allow a greater weighting (i.e., larger in magnitude) for the integral term when the control variable is far from the set point, and a reduced weighting (i.e., smaller in magnitude) closer to the set point. However, if the control variable is sufficiently far from the set point, this method for selecting coefficients can still result in large contributions from the integral term when the control variable is actually returning toward the set point. As a result, this method for selecting controller coefficients can still result in substantial overshoot by the control variable.

Instead of using a fixed set of coefficients and/or selecting coefficients based on the distance of a control variable from a set point, in various aspects the coefficient for the integral term (and/or other coefficients) can be selected using dynamic tuning logic that is based on a comparison of the control variable with a reasonable progress curve. A reasonable progress curve can be determined at any given time "t+Δt" based on the value of the corresponding control variable at time "t". One option for defining a reasonable progress curve is to use a simple linear functional form, such as $$RPC(t+\Delta t)=CV(t)+/-AT \qquad (1)$$

where RPC(t) is the value of the Reasonable Progress Curve at time t, CV(t) is the value of the Control Variable at time t, and AT is an Aggressiveness Term. The Aggressiveness Term corresponds to a desired amount of change (such as a rate of change) in the control variable toward the set point in a unit of time Δt. The unit of time Δt can be any convenient unit, such as a second, millisecond, minute, or another convenient time unit. The "+/−" reflects the fact that AT is added to CV(t) to determine a reasonable progress curve value when the control variable is less than the set point, while AT is subtracted from CV(t) to determine a reasonable progress curve value when the control variable is above the set point. In other aspects, other functional forms can be used, such as linear functional forms, polynomial functional forms, exponential functional forms, logarithmic functional forms, or combinations thereof.

Based on Equation (1), a reasonable progress curve can be determined based on the measured values of the control variable. When the control variable is both returning toward the set point and the difference between the control variable and the set point is less than the difference between the reasonable progress curve and the set point at a given time, the coefficient for the integral term can be selected so that the integral term has a reduced or minimized weighting. This can reduce the value of the manipulated variable so that the control variable has a reduced or minimized likelihood of substantially overshooting the set point. When the difference between the control variable and set point is increasing and/or when the difference between the control variable and the set point is greater than the difference specified by the reasonable progress curve at that time, a larger weighting for the integral term can be used in order to drive the control variable toward the set point.

It is noted that the definition provided in Equation (1) can mathematically correspond to a series of discrete points due to the nature of available measurements for a control variable. In other words, in some aspects the reasonable progress curve can mathematically correspond to a series of data points, as opposed to being explicitly defined by a mathematical function that could provide a mathematically continuous definition for the reasonable progress curve. In some optional aspects, additional values for a reasonable progress curve can be defined by, for example, interpolating the values of the reasonable progress curve between explicitly calculated points by any convenient method, such as linear interpolation. This can allow comparisons to be made in a situation where a measurement time for the control variable does not match any existing calculated value of the reasonable progress curve. Curve fitting can potentially also be used, if desired, to provide a mathematically continuous description for one or more regions of the reasonable progress curve.

In some aspects, a reasonable progress curve can be used for coefficient selection for a controller regardless of the distance of the control variable from the corresponding set point. In other aspects, when a control variable is within a desired range from the set point, the reasonable progress curve can be optional. This can correspond to a situation where some natural variation in a control variable is acceptable or possibly even desirable. When the reasonable progress curve is optional, this can correspond to either not calculating the reasonable progress curve, or not using the reasonable progress curve as part of determining the coefficients for the corresponding controller. It is noted that the desired operating range around the set point does not need to be symmetric. Additionally, the desired range around the set point where a reasonable progress curve is not used can correspond to a plurality of different ranges with regard to zones for selecting coefficients for a controller. In such optional aspects, after the value of the control variable leaves the desired range from the set point, the reasonable progress curve can be used as part of a control strategy to return the control variable to the set point and/or the desired range.

When a control variable is farther from the set point than the value specified by the reasonable progress curve, one of several actions can occur. One action can correspond to changing the coefficients for the integral term of the controller so that the integral term provides a larger contribution. This can increase the rate of return of the control variable to the set point. Optionally, this change in coefficients can be maintained until at a given time the control variable is closer to the set point than the current value specified by the reasonable progress curve. It is noted that for some controllers, the coefficient for the integral term is actually inversely proportional to the weighting for the intergral term. In other words, for some controllers a small coefficient for the integral term results in a weighting that is larger in magnitude for the integral term.

It is noted that the dynamic tuning logic described herein can allow for a different type of behavior than a conventional derivative term for a PID controller. In a PID controller, the derivative term can allow for a modification of the manipulated variable based on the current rate of change (and/or recent rates of change) of the control variable. This is in contrast to use of a reasonable progress curve, where the value of the control variable relative to the reasonable progress curve can be used to determine the coefficient used for the integral term of the controller. This can provide an improved level of control, as the weighting of the derivative term does not need to be somehow matched or balanced with the weighting of the integral term. Instead, the comparison of the control variable and the reasonable progress curve allows the coefficient for the integral term to be directly modified, so that the controller output can be determined based on the relative weightings of the proportional and integral terms. This direct modification of the integral term can also reduce or minimize any instability that may be associated with use of a derivative term during operation of a controller.

Implementation of Dynamic Tuning Logic: Reasonable Progress Curve

As an initial step for implementing dynamic tuning logic as described herein, at least one error band, and typically a plurality of error bands, can be defined for a control variable. In various aspects, at least one error band can correspond to a value greater than the set point while another error band can correspond to a value lower than the set point. A grouping of an error band greater than the set point with an error band less than the set point can correspond to a set of error bands. It is noted that the distance from the set point for each error band in a set of error bands can be independently selected.

The error bands associated with a set point for a control variable can define various regions of operation for the control variable. A first set of error bands can define a first region near the set point for a control variable that corresponds to desired or acceptable operation. Within the first set of error bands, variations in the value of the control variable around the set point can be acceptable or even desirable.

Several alternative strategies can be used for determining the coefficients for a controller within the set of error bands closest to the set point. One option can be to use dynamic tuning logic as described above. In this type of strategy, the coefficients for the controller can be determined based on the relationship of the value of the control variable to the reasonable progress curve, so that a first set of coefficients is used when the control variable is at set point and/or returning to set point with sufficient progress, while a second set of coefficients can be used when the control variable is diverging from the set point and/or not returning to set point at a sufficiently fast rate. Another option can be to have a single set of coefficients for the controller within the first set of error bands. This can correspond to either not determining a reasonable progress curve within the first set of error bands, or this can correspond to determining a reasonable progress curve but not using the reasonable progress curve to determine the coefficients for the controller.

In some aspects, a second set of error bands can be defined outside of the first set of error bands. This can define a region between the first set of error bands and the second set of bands. When the control variable has a value between the first set of error bands and the second error bands, the dynamic tuning logic methods described above can be used to select the coefficients for the controller, and specifically for the integral term of the controller. In some aspects, if the second set of error bands is present, values of the control variable beyond the second set of error bands may not trigger use of the reasonable progress curve until the control variable returns to a value between the first and second set of error bands. In such aspects, values of the control variable beyond the second set of error bands may result in use of coefficients with a larger weighting for the integral term, in order to return the control variable to the region between the first set of error bands and second set of error bands. In other aspects, dynamic tuning logic (including a reasonable progress curve) may be used in the region beyond the second set of error bands. In the region beyond the second set of error bands, the definition for the reasonable progress curve may be different from the definition in the other regions and/or the definitions for the coefficients for the controllers may be different from the definitions in the other regions. In still other aspects, a second set of error bands may not be present, so that the same dynamic tuning logic (i.e., same definition for reasonable progress curve and same coefficients) can be used for all values of the control variable outside of the first error band.

In yet other aspects, any convenient number of additional error bands may also be specified to allow for specification of additional regions with different controller coefficients. Each set of additional error bands can define an additional region where a) a reasonable progress curve may optionally be used, and b) the coefficients for the controller (including coefficients selected using dynamic tuning logic based on a reasonable progress curve), may be the same or different from other regions.

Figure 1:
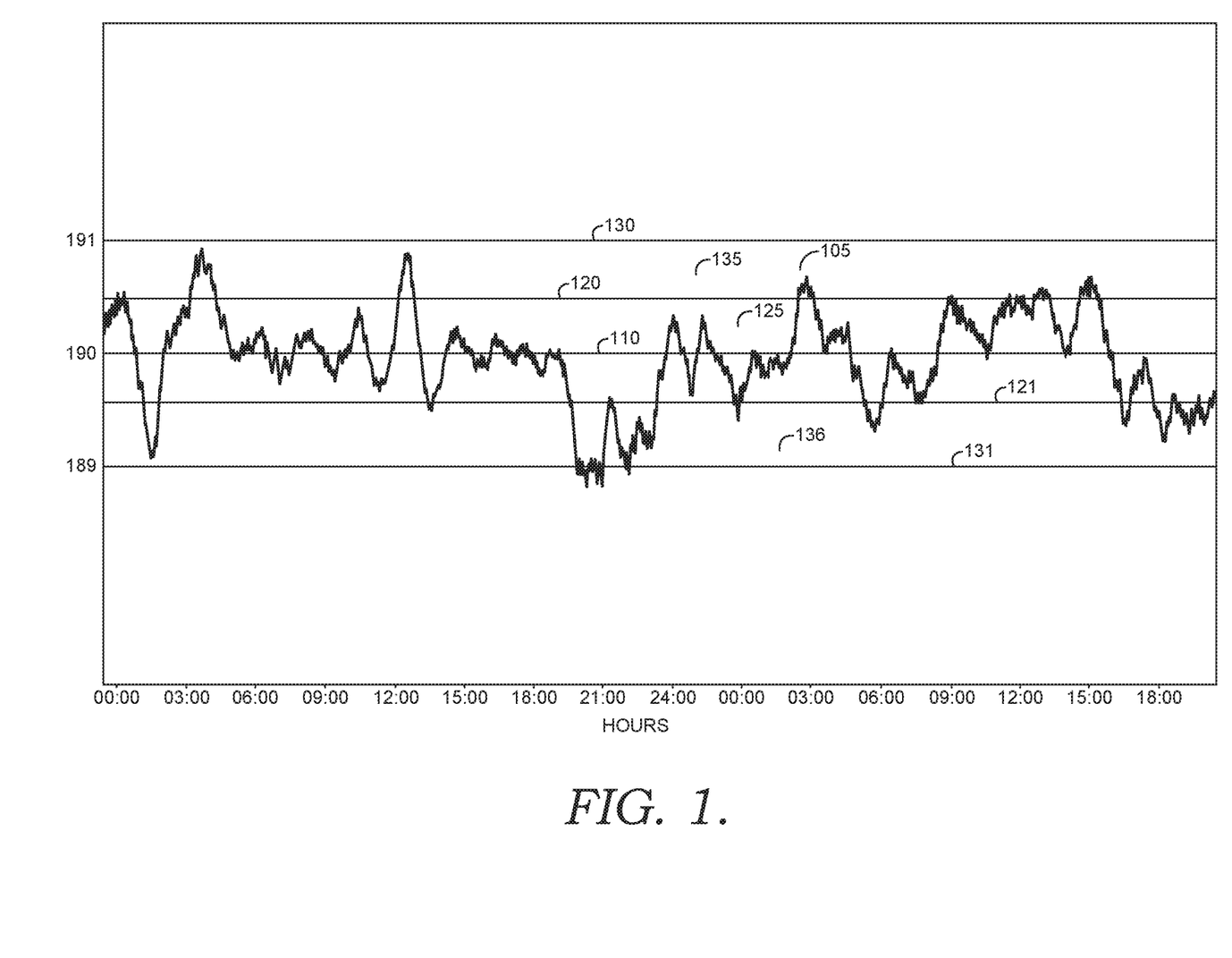
FIG. 1 shows an example of error bands around a set point for a control variable.

To further illustrate the concepts described herein, FIG. 1 shows an example of error bands relative to a set point for a control variable. In FIG. 1, a control variable 105 can have a set point value 110. The set point in FIG. 1 corresponds to a fixed value, but any other convenient method of specifying a set point value may be used. FIG. 1 further shows a first set of error bands 120 and 121 relative to set point value 110. Error band 120 corresponds to an error band greater than set point value 110 while error band 121 corresponds to an error band less than set point value 110. First set of error bands 120 and 121 define a first region 125 of acceptable values for the control variable 105. Divergence of the control variable 105 from the set point 110 in first region 125. Because set point 110 is a fixed value, first error bands 120 and 121 also appear as set values in FIG. 1. However, first set of error bands 120 and 121 can vary to maintain a desired region 125 around set point 110. FIG. 1 further shows a second set of error bands 130 and 131 relative to set point 110. Error band 130 corresponds to an error band greater than set point value 110 while error band 131 corresponds to an error band less than set point value 110. Second set of error bands 130 define second regions 135 and 136 on either side of region 125.

Figure 2:
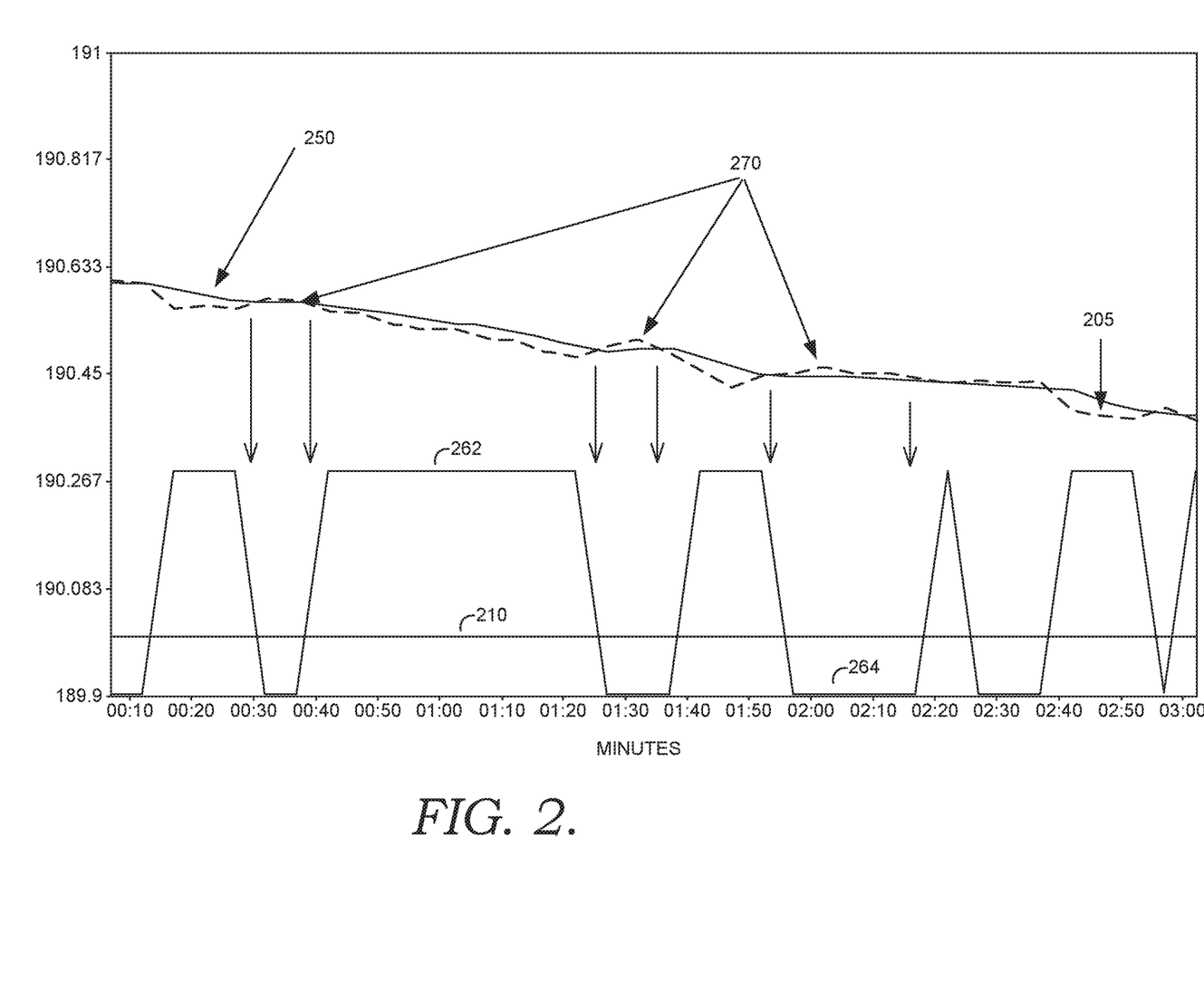
FIG. 2 shows an example of a reasonable progress curve for a control variable.

FIG. 2 shows an example of how a reasonable progress curve was used in conjunction with the value of a control variable to select coefficients for a process controller. In order to simplify the figure, the error bands around set point 210 are not shown in FIG. 2. In FIG. 2, line 210 corresponds to the desired set point value for the control variable 205 (dashed line). Although the error bands are not shown, control variable 205 in FIG. 2 was in the region between the first and second error bands. Reasonable progress curve 250 (solid line) shows the desired reasonable progress curve that was calculated for the control variable 205. The reasonable progress curve 250 based on a functional form corresponding to Equation (1) above. When control variable 205 (dashed line) was below reasonable progress curve 250 (solid line), the control variable was making reasonable progress toward set point 210 and therefore a first set of coefficients was used. The first set of coefficients included a large value 262 for the integral coefficient. In the example shown in FIG. 2, the value of the integral coefficient was (roughly) inversely proportional to the contribution of the integral term, so selection of a larger integral coefficient resulted in a reduced or lower weighting for the integral term in determining the controller output for modifying the manipulated variable. At other times, such as the locations indicated by arrows 270, the control variable was above the reasonable progress curve 250, which resulted in use of a second set of coefficients. The second set of coefficients included a lower value 264 for the integral coefficient, which resulted in an increased weighting for the integral term in determining the controller output for modifying the manipulated variable. It is noted that the locations indicated by arrows 270 have corresponding arrows that approximately show the length of time where the value of the control variable 205 was below the value of reasonable progress curve 250. It is also noted that for the coefficient selection in FIG. 2, a ramp period exists between the use of larger integral coefficient 262 (for a reduced integral term contribution) and the use of smaller integral coefficient 264 (for an increased integral term contribution).

Example of Controller Configuration

Figure 3:
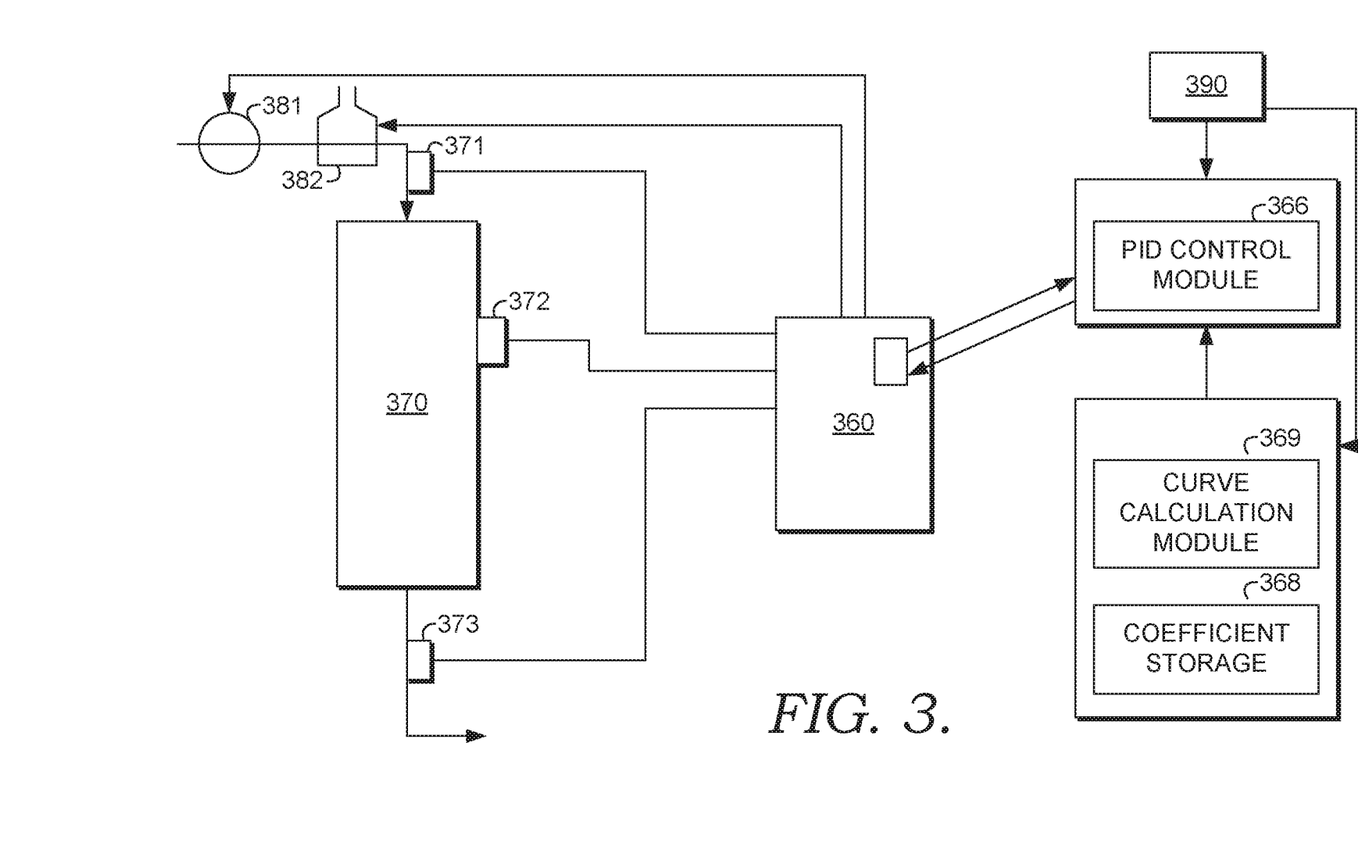
FIG. 3 schematically shows an example of a process controller.

FIG. 3 schematically shows an example of process controller configuration for implementing a reasonable progress curve as part of the process controller configuration. In FIG. 3, a controller 360 is part of an overall control system for a reactor 370 including at least one source of controller input (corresponding to a control variable) and at least one device for receiving controller output (for controlling a manipulated variable). In FIG. 3, multiple examples of sources of controller input and devices for receiving controller output are shown as being related to a single controller, but this is for convenience in illustrating potential applications of a process controller. In practice, a process controller can often be configured to receive a single controller input based on a control variable and to generate a single controller output for controlling a manipulated variable. Examples of detectors to provide a source of controller input based on a corresponding control variable can include, but are not limited to, a thermocouple, thermometer, or other temperature detector 371, a pressure detector 372, or a detector for product characterization 373. A detector for product characterization can correspond to any convenient type of method for characterizing an effluent from a reactor, such as a viscometer, a mass spectrometer, a spectrometer for characterizing electromagnetic radiation (i.e., IR spectrometer, UV/VIS spectrometer), a sulfur detector, or another convenient type of product characterization. A device for receiving controller output can correspond to an actuator, an electrical activator, or another process controller. In this latter situation, a first process controller can provide a controller output signal that is used as the controller input signal for a second process controller. In other words, the "control variable" for the second process controller can be the controller output form the first process controller. Thus, in addition to the detectors noted above, a first process controller can serve as the controller input source for a second process controller. An input actuator can correspond to, for example, an actuator 381 associated with a valve to change the valve position. An input electrical activator can correspond to a controller for changing the operation of device that does not necessarily require physical motion to be changed. For example, an electrical activator 382 can change the duty cycle of a heater and/or change a temperature set point for a heater.

During operation, process controller 360 can receive controller input from a detector (or from a plurality of detectors) 371, 372, or 373, or alternatively from another process controller. This controller input can be processed to determine the current value of a control variable and to provide an appropriate controller output for control of a device corresponding to a manipulated variable, such as an output signal for an actuator 381 (such as for controlling a valve position) or an output signal for an electrical activator 382 (such as for controlling a duty cycle of a heater). The controller input from a detector (or optionally from another process controller) can be processed using a proportional-integral control module 366 to generate the appropriate controller output. Optionally, the proportional-integral control module 366 can be a proportional-integral-derivative (PID) control module. In FIG. 3, the controller input from one or more of detectors 371, 372, or 373 can also be used by curve calculation module 369 to determine a reasonable progress curve. This can allow for selection of an appropriate set of coefficients for the proportional, integral, (and optional derivative) terms from coefficient storage 368. The selected set of coefficients for the proportional, integral, (and optional derivative) terms can be used by proportional-integral control module 366 for determining the controller output signal to actuator 381 and/or electrical activator 382.

In addition to the above, the proportional-integral control module 366 can also receive changes to the set point and/or error bands for a control variable, such as from a set point modification module 390. Set point modification module 390 can also provide set point and/or error band changes to curve calculation module 369. Alternatively, changes to the set point can be provided from various other types of components, such as an input provided by a process controller associated with another control variable. It is noted that the various components for providing dynamic tuning logic can be grouped or located in any convenient manner. For example, curve calculation module 369 and coefficient storage 368 can be co-located with proportional-integral control module 366 if desired.

Example: Use of Controllers with a Distillation Tower

One example of a system that can benefit from use of controllers that implement dynamic tuning logic is a distillation tower. In some aspects a distillation tower can correspond to an atmospheric distillation tower, such as a tower that performs separations at a pressure of at least about 90 kPaa, or at least about 100 kPaa, such as from about 90 kPaa to about 150 kPaa, or about 100 kPaa to about 150 kPaa. Alternatively, a distillation tower can correspond to a vacuum distillation tower that performs separations at a pressure of about 100 kPaa or less, or about 90 kPaa or less, such as about 10 kPaa to about 90 kPaa, or about 10 kPaa to about 100 kPaa.

A process controller can potentially be used to regulate a variety of control variables within a distillation tower. One control variable can correspond to the temperature of the distillation tower. There are potentially several manipulated variables that could be used to modify the temperature of the distillation tower. One potential manipulated variable can correspond to the current supplied to heating coils used for a heater that heats the feed prior to entry into the tower. A second potential manipulated variable can correspond to a valve position for a conduit that introduces steam into the tower along with the feed. Depending on where the temperature is being measured, still other potential manipulated variables can correspond to valve positions for other steam conduits associated with the distillation tower. The temperature in a distillation tower is an example of a control variable that can have a substantial lag between the time when a divergence in temperature from a set point is detected and the time when a change in the manipulated variable starts to cause the control variable to return to the set point.

Another potential control variable can correspond to the liquid level associated with a reboiler for the distillation tower. A potential manipulated variable can be the valve position for a valve on a steam conduit associated with the reboiler. The reboiler for a distillation tower is an example where "tight" control over a control variable by a process controller can be desirable.

Figure 4:
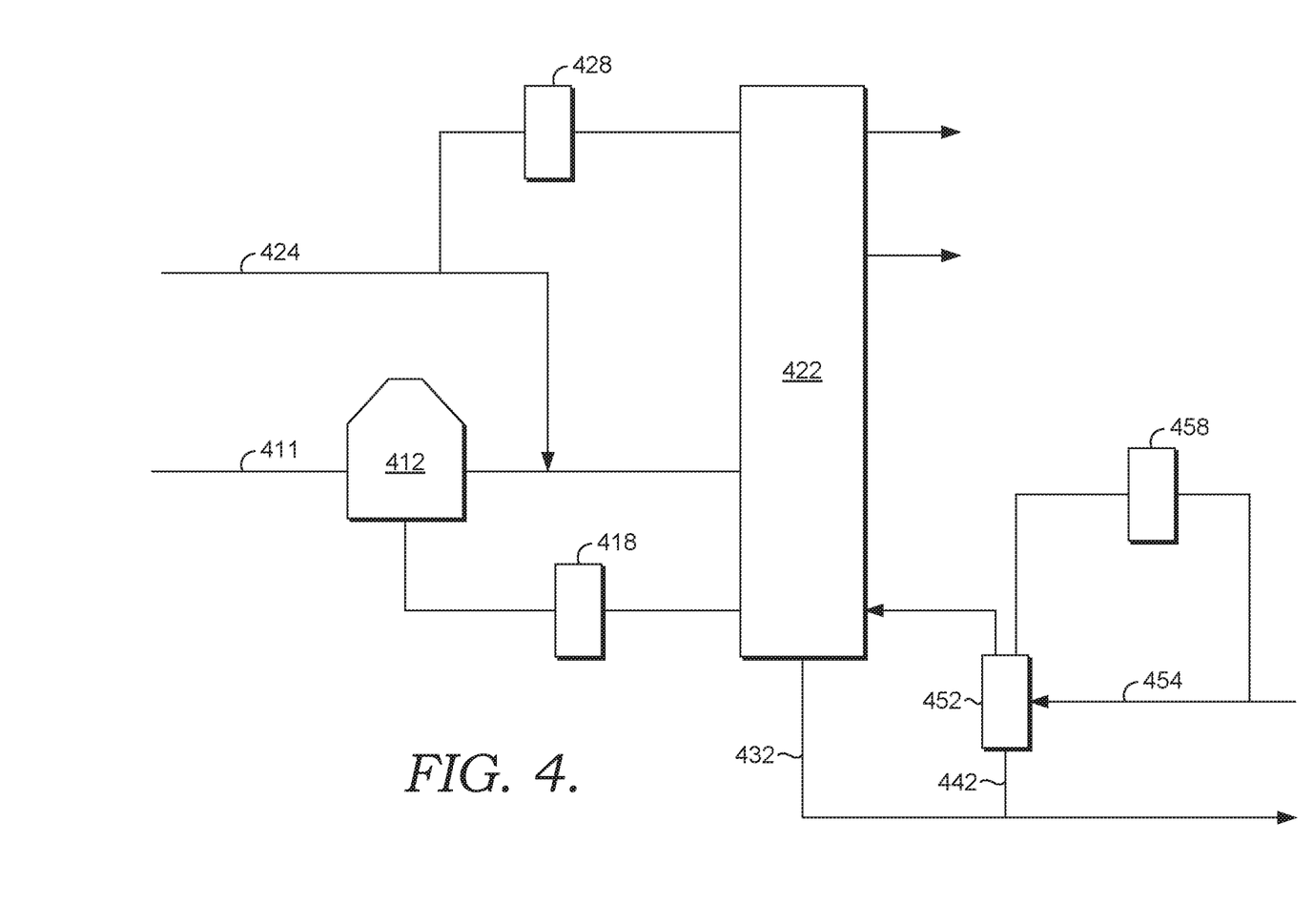
FIG. 4 schematically shows an example of integration of one or more process controllers with a distillation tower.

FIG. 4 schematically shows an example of a distillation tower that includes a reboiler and various control valves associated with the distillation tower and/or reboiler. In FIG. 4, a feed 411 is passed through a pre-heater 412 prior to entering distillation tower 422. Pre-heater 412 optionally has a corresponding process controller 418 for controlling a temperature within distillation tower 422 as a control variable. Steam 424 is also introduced into distillation tower 422 along with the feed 411. Steam 424 optionally has a corresponding process controller 428 for controlling a temperature within distillation tower 422 as a control variable. During operation, a bottoms fraction 432 is withdrawn from the tower, and a portion 442 of the bottoms fraction is passed into a reboiler 452. The liquid level in reboiler 452 can be modified based on steam 454 that is introduced into reboiler 452. Steam 454 has a corresponding process controller 458 that is used to control the liquid level.

Example—Reactor with Multiple Interacting Controllers

Figure 5:
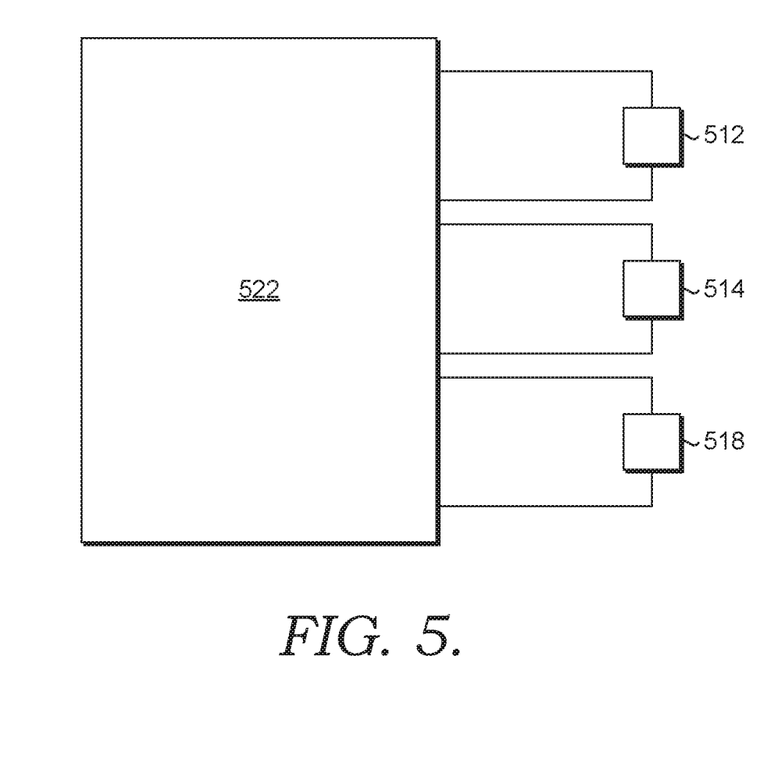
FIG. 5 schematically shows an example of use of multiple process controllers with a reactor.

FIG. 5 shows another example of a reaction system that includes a plurality of process controllers. In FIG. 5, the reaction system includes a reactor 522. The reactor 522 can optionally be a reactor with a large volume relative to the input flows into the reactor. A plurality of process controllers 512, 514, and 518 are associated with reactor 522 for control of control variables related to a process in reactor 522. The process controllers 512, 514, and 518 can be configured for control of any convenient control variable, such as temperatures, pressures, input/output flow rates, controller output values from another controller, and/or properties of the products generated from the reaction in reactor 522. For example, if reactor 522 corresponds to a polymerization reactor for formation of a polymer product, potential control variables can correspond to properties of the resulting polymer product such as melt index or average molecular weight. As another example, if reactor 522 corresponds to a hydroprocessing reactor, potential control variables can correspond to properties of the resulting hydroprocessed effluent, such as sulfur content, pour point, or aromatics content.

Although each process controller in FIG. 5 can have a corresponding manipulated variable (such as a valve or current for a heating coil) and a corresponding control variable, one or more of the process controllers in FIG. 5 can also have indirect relationships to at least one control variable different from the corresponding control variable.

Additional Example

Figure 6:
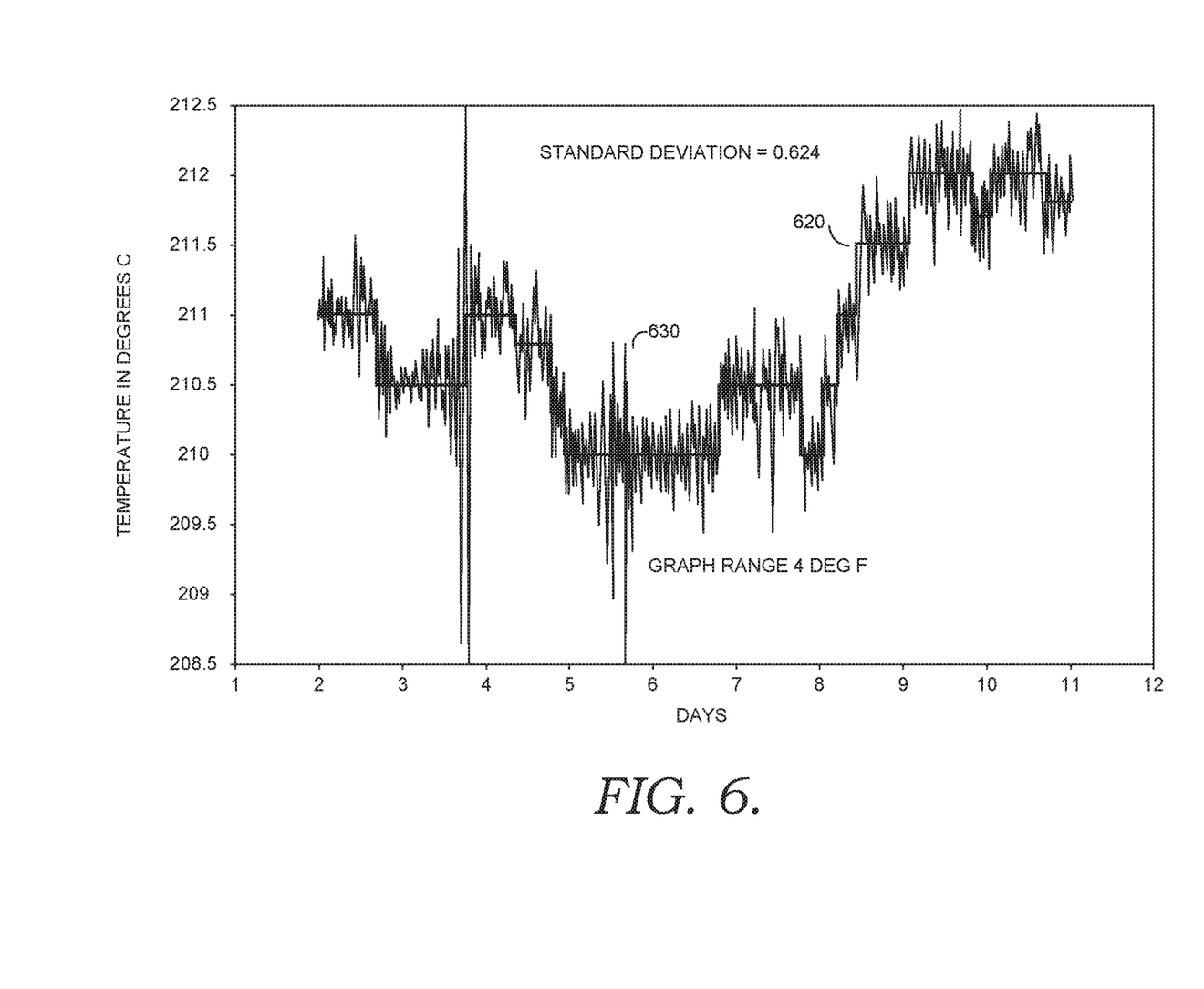
FIG. 6 shows an example of using a process controller to modify the value of a control variable.
Figure 7:
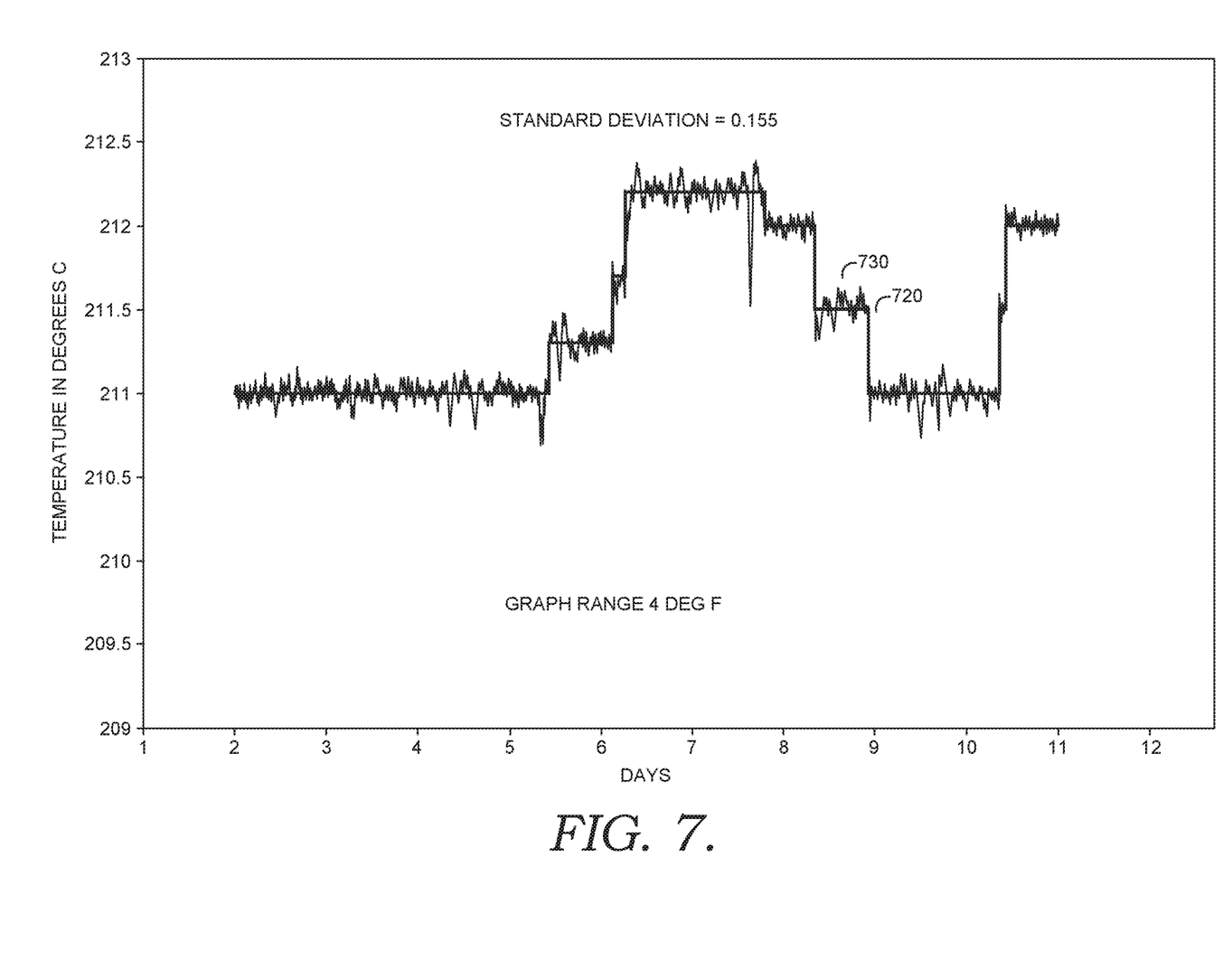
FIG. 7 shows an example of using a process controller that includes implementation of dynamic tuning logic to modify the value of a control variable.

FIGS. 6 and 7 show the value of a temperature (control variable) associated with a reactor for a polyethylene production process. The temperature values shown in FIG. 6 correspond to control of the temperature using a conventional PID type controller. The temperature values shown in FIG. 7 correspond to control of the temperature using a controller that includes use of a reasonable progress curve as described herein. For the data shown in FIGS. 6 and 7, the corresponding manipulated variable is a cooling jacket, where the process controller provides input to an actuator for a valve that controls the flow of water in the cooling jacket. A comparison of the plots shown in FIGS. 6 and 7 can demonstrate some of the potential benefits of using a controller with a reasonable progress curve. In FIG. 6, the solid line 620 represents the desired set point for the temperature. The set point can be changed for any convenient reason, such as based on characterization of a product quality (i.e., in this example, a product quality associated with polyethylene produced in the reaction). Curve 630 shows the fluctuations of the temperature relative to the desired set point when the temperature is controlled using a conventional PID type controller. The standard deviation for the temperature relative to the desired set point is 0.624. In FIG. 7, as shown by curve 730 relative to set point 720, the standard deviation is substantially reduced to 0.155 by using a controller that can utilize a reasonable progress curve for selection of controller coefficients.

Additional Embodiments

Embodiment 1. A method for controlling a process using a process controller, comprising: performing a chemical production process or petroleum refining process at conditions comprising a value for a control variable, the control variable having an associated process controller and a corresponding manipulated variable; detecting a first value of the control variable different from a set point value at a first point in time; calculating a reasonable progress curve value for a second point in time based on the detected first value of the control variable; detecting a second value of the control variable at the second point in time, a difference between the detected second value of the control variable and the set point value being greater than a difference between the reasonable progress curve value for the second point in time and the set point value; selecting a first set of operating coefficients for the process controller based on the detected second value of the control variable, the first set of operating coefficients comprising a first integral coefficient for providing a first weighting for an integral term of the process controller; and operating the process controller to modify the corresponding manipulated variable, the process controller being operated using the selected first set of operating coefficients.

Embodiment 2. The method of Embodiment 1, the method further comprising: detecting, while operating the process controller using the selected first set of operating conditions, a third value of the control variable different from a set point value at a third point in time, the third point in time being after the first point in time; calculating a reasonable progress curve value for a fourth point in time based on the detected third value of the control variable; detecting a fourth value of the control variable at the fourth point in time, a difference between the detected fourth value of the control variable and the set point value being less than or equal to a difference between the reasonable progress curve value for the fourth point in time and the set point value; selecting a second set of operating coefficients for the process controller based on the detected value of the control variable at the fourth point in time, the second set of operating coefficients comprising a second integral coefficient for providing a second weighting for the integral term of the process controller, the second weighting being smaller in magnitude than the first weighting; and operating the process controller to modify the corresponding manipulated variable, the process controller being operated using the selected second set of operating coefficients, wherein the second point in time is optionally the same as the third point in time.

Embodiment 3. The method of Embodiment 2, wherein the first value of the control variable and the third value of the control variable are within a first set of error bands associated with the set point value, the method further comprising: detecting a fifth value of the control variable different from the set point value at a fifth point in time, the detected fifth value of the control variable being outside the first set of error bands associated with the set point value; calculating a reasonable progress curve value for a sixth point in time based on the detected fifth value of the control variable; detecting a sixth value of the control variable at the sixth point in time, a difference between the detected second value of the control variable and the set point value being greater than a difference between the reasonable progress curve value for the second point in time and the set point value; selecting a third set of operating coefficients for the process controller based on the detected sixth value of the control variable, the third set of operating coefficients comprising a third integral coefficient for providing a third weighting for the integral term of the process controller, the third weighting being greater in magnitude than the first weighting; and operating the process controller to modify the corresponding manipulated variable, the process controller being operated using the selected third set of operating coefficients.

Embodiment 4. The method of Embodiment 3, wherein the first value of the control variable and the third value of the control variable are outside a second set of error bands associated with the set point value, the second set of error bands being closer to the set point value than the first set of error bands, the method further comprising: detecting a seventh value of the control variable different from the set point value at a seventh point in time, the detected seventh value of the control variable being within the second set of error bands associated with the set point value; and selecting a fourth set of operating coefficients for the process controller based on the detected seventh value of the control variable, the fourth set of operating coefficients comprising a fourth integral coefficient for providing a fourth weighting for the integral term of the process controller, the fourth weighting being lower than or equal to in magnitude than the weighting of the first integral coefficient.

Embodiment 5. The method of Embodiment 4, further comprising: calculating a reasonable progress curve value for an eighth point in time based on the detected seventh value of the control variable, wherein the process controller is operated based on the selected fourth set of operating coefficients without comparison of a value of the control variable at the eighth point in time to the calculated reasonable progress curve value at the eighth point in time, and without comparison of the value of the control variable at the seventh point in time to a value of the reasonable progress curve at the seventh point in time.

Embodiment 6. The method of any of the above embodiments, wherein a time lag between the first point in time and the second point in time is at least about 5 minutes, or at least about 15 minutes, or at least about 30 minutes, or at least about 1 hour.

Embodiment 7. The method of any of the above embodiments, wherein the chemical production process or petroleum refining process comprises a plurality of additional control variables having associated additional process controllers and corresponding additional manipulated variables, at least one of the plurality of corresponding additional manipulated variables having an indirect relationship with the control variable.

Embodiment 8. The method of any of the above embodiments, wherein calculating a reasonable progress curve value for a second point in time comprises determining a reasonable progress curve value by interpolation between the value calculated based on the first point in time and a value calculated based on an additional point in time.

Embodiment 9. The method of any of the above embodiments, wherein the set point value varies as a function of time, or wherein the first set of operating conditions further include a first proportional gain coefficient and the third set of operating conditions include a third proportional gain coefficient different from the first proportional gain coefficient, or a combination thereof.

Embodiment 10. A process control system, comprising: a detector for detection of a control variable; an actuator, electrical activator, second process controller, or combination thereof for modifying a manipulated variable; a first process controller in communication with the detector to receive detected values of the control variable and in communication with the actuator, electrical activator, second process controller, or combination thereof to provide a controller output for control of the manipulated variable, the first process controller further comprising a processor having an associated memory containing executable instructions that, when executed, provide a method for controlling the manipulated variable according to any of the above embodiments.

Embodiment 11. A process control system, comprising: a detector for detection of a control variable; an actuator, electrical activator, second process controller, or combination thereof for modifying a manipulated variable; a first process controller in communication with the detector to receive detected values of the control variable and in communication with the actuator, electrical activator, second process controller, or combination thereof to provide a controller output for control of the manipulated variable, the first process controller further comprising a processor having an associated memory containing executable instructions that, when executed, provide a method for controlling the manipulated variable comprising: detecting a first value of the control variable different from a set point value at a first point in time; calculating a reasonable progress curve value for a second point in time based on the detected first value of the control variable; detecting a second value of the control variable at the second point in time, a difference between the detected second value of the control variable and the set point value being greater than a difference between the reasonable progress curve value for the second point in time and the set point value; selecting a first set of operating coefficients for the process controller based on the detected second value of the control variable, the first set of operating coefficients comprising a first integral coefficient for providing a first weighting for an integral term of the first process controller; controlling the actuator, electrical activator, second process controller, or combination thereof to modify the manipulated variable using the selected first set of operating coefficients; detecting, while operating the process controller using the selected first set of operating conditions, a third value of the control variable different from a set point value at a third point in time, the third point in time being after the first point in time; calculating a reasonable progress curve value for a fourth point in time based on the detected third value of the control variable; detecting a fourth value of the control variable at the fourth point in time, a difference between the detected fourth value of the control variable and the set point value being less than or equal to a difference between the reasonable progress curve value for the fourth point in time and the set point value; selecting a second set of operating coefficients for the process controller based on the detected value of the control variable at the fourth point in time, the second set of operating coefficients comprising a second integral coefficient for providing a second weighting for the integral term of the first process controller, the second weighting being smaller in magnitude than the first weighting; and controlling the actuator, electrical activator, second process controller, or combination thereof to modify the manipulated variable using the selected second set of operating coefficients.

Embodiment 12. The system of Embodiment 10 or 11, a) wherein the first process controller comprises a proportional-integral process controller, b) wherein the actuator modifies a position of a valve, c) wherein the electrical activator modifies a duty cycle of a heater, d) a combination of any two of a), b) and c), or e) a combination of a), b) and c).

Embodiment 13. A process controller, comprising: a proportional-integral control module for receiving a detected values of a control variable and generating a controller output for control of a manipulated variable; a curve calculation module for determining a reasonable progress curve based on detected values of the control variable; and a coefficient storage module for providing coefficients to the proportional-integral control module based on a detected value of the control variable and a reasonable progress curve value, the process controller optionally comprising a proportional-integral controller or a proportional-integral-derivative controller.

Embodiment 14. The system of Embodiment 13, wherein the process controller further comprises a set point modification module for providing to the proportional-integral control module a set point for the control variable, one or more error bands for the control variable, or a combination thereof.

Embodiment 15. The system of Embodiment 13 or 14, further comprising: a detector for detection of the control variable; and an actuator, electrical activator, second process controller, or combination thereof for receiving the controller output and modifying a manipulated variable, the process controller being in communication with the detector to receive detected values of the control variable and being in communication with the actuator, electrical activator, second process controller, or combination thereof to provide the controller output for control of the manipulated variable.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for controlling a process within a reaction system using a process controller operably connected to the reaction system, comprising:

performing one of a chemical production process and a petroleum refining process within the reaction system at conditions comprising a value for a control variable, the control variable having an associated process controller and a corresponding manipulated variable;

detecting using at least one detector operably connected to the reaction system to detect a first value of the control variable for the one of a chemical production process and a petroleum refining process different from a set point value at a first point in time;

calculating a reasonable progress curve value for a second point in time based on the detected first value of the control variable using a control module within the process controller;

detecting using one of at least one detector and the process controller to detect a second value of the control variable at the second point in time, a difference between the detected second value of the control variable and the set point value being greater than a difference between the reasonable progress curve value for the second point in time and the set point value;

selecting a first set of operating coefficients for the process controller based on the detected second value of the control variable, the first set of operating coefficients comprising a first integral coefficient for providing a first weighting for an integral term of the process controller, wherein the selecting the first set of operating coefficients is performed by the process controller; and operating the process controller to modify the corresponding manipulated variable to control the operation of the process within the reaction system, the process controller being operated in response to a controller output signal generated by the control module using the selected first set of operating coefficients.

2. The method of claim 1, the method further comprising:
  detecting, while operating the process controller using the selected first set of operating conditions, a third value of the control variable different from a set point value at a third point in time, the third point in time being after the first point in time, wherein detecting the third value is performed using one of at least one detector and a process controller;
  calculating a reasonable progress curve value for a fourth point in time based on the detected third value of the control variable using the control module within the process controller;
  detecting a fourth value of the control variable at the fourth point in time, a difference between the detected fourth value of the control variable and the set point value being less than or equal to a difference between the reasonable progress curve value for the fourth point in time and the set point value, wherein detecting the fourth value is performed using one of at least one detector and a process controller;
  selecting a second set of operating coefficients for the process controller based on the detected value of the control variable at the fourth point in time, the second set of operating coefficients comprising a second integral coefficient for providing a second weighting for the integral term of the process controller, the second weighting being smaller in magnitude than the first weighting, wherein the selecting the second set of operating coefficients is performed by the process controller; and
  operating the process controller to modify the corresponding manipulated variable to control the operation of the process within the reaction system, the process controller being operated in response to a controller output signal generated by the control module using the selected second set of operating coefficients.

3. The method of claim 2, wherein the second point in time is the same as the third point in time.

4. The method of claim 2, wherein the first value of the control variable and the third value of the control variable are within a first set of error bands associated with the set point value.

5. The method of claim 4, further comprising:
  detecting a fifth value of the control variable different from the set point value at a fifth point in time, the detected fifth value of the control variable being outside the first set of error bands associated with the set point value, wherein detecting the fifth value is performed using one of at least one detector and a process controller;
  calculating a reasonable progress curve value for a sixth point in time based on the detected fifth value of the control variable using the control module within the process controller;
  detecting a sixth value of the control variable at the sixth point in time, a difference between the detected second value of the control variable and the set point value being greater than a difference between the reasonable progress curve value for the second point in time and the set point value, wherein detecting the sixth value is performed using one of at least one detector and a process controller;
  selecting a third set of operating coefficients for the process controller based on the detected sixth value of the control variable, the third set of operating coefficients comprising a third integral coefficient for providing a third weighting for the integral term of the process controller, the third weighting being greater in magnitude than the first weighting, wherein the selecting the third set of operating coefficients is performed by the process controller; and
  operating the process controller to modify the corresponding manipulated variable to control the operation of the process within the reaction system, the process controller being operated in response to a controller output signal generated by the control module using the selected third set of operating coefficients.

6. The method of claim 4, wherein the first value of the control variable is outside a second set of error bands associated with the set point value, the second set of error bands being closer to the set point value than the first set of error bands.

7. The method of claim 6, wherein the third value of the control variable is outside the second set of error bands associated with the set point value.

8. The method of claim 6, further comprising:
  detecting a seventh value of the control variable different from the set point value at a seventh point in time, the detected seventh value of the control variable being within the second set of error bands associated with the set point value, wherein detecting the sixth value is performed using one of at least one detector and a process controller; and
  selecting a fourth set of operating coefficients for the process controller based on the detected seventh value of the control variable, the fourth set of operating coefficients comprising a fourth integral coefficient for providing a fourth weighting for the integral term of the process controller, the fourth weighting being lower than or equal to in magnitude than the weighting of the first integral coefficient.

9. The method of claim 8, further comprising:
  calculating a reasonable progress curve value for an eighth point in time based on the detected seventh value of the control variable,
  wherein the process controller is operated based on the selected fourth set of operating coefficients without comparison of a value of the control variable at the eighth point in time to the calculated reasonable progress curve value at the eighth point in time, and without comparison of the value of the control variable at the seventh point in time to a value of the reasonable progress curve at the seventh point in time.

10. The method according to claim 1, wherein a time lag between the first point in time and the second point in time is at least about 5 minutes, or at least about 15 minutes, or at least about 30 minutes, or at least about 1 hour.

11. The method according to claim 1, wherein the chemical production process or petroleum refining process comprises a plurality of additional control variables having associated additional process controllers and corresponding additional manipulated variables, at least one of the plurality of corresponding additional manipulated variables having an indirect relationship with the control variable.

12. The method according to claim 1, wherein calculating a reasonable progress curve value for a second point in time comprises determining a reasonable progress curve value by interpolation between the value calculated based on the first point in time and a value calculated based on an additional point in time.

13. The method according to claim 1, wherein the set point value varies as a function of time.

14. The method according to claim 1, wherein the first set of operating conditions further include a first proportional gain coefficient and the third set of operating conditions include a third proportional gain coefficient different from the first proportional gain coefficient.

15. A process control system for controlling a reaction system, wherein the reaction system performs one of a chemical reaction process and a petroleum refining process with the reaction system, wherein the process control system is operably connected to the reaction system, the process control system comprising:
   a detector for detection of a control variable, wherein the control variable having a corresponding manipulated variable;
   at least one of an actuator, an electrical activator, a second process controller, or combination thereof for modifying a manipulated variable;
   a first process controller in communication with the detector to receive detected values of the control variable and in communication with at least one of the actuator, electrical activator, second process controller, or combination thereof to provide a controller output for control of the manipulated variable, the first process controller further comprising a processor having an associated memory containing executable instructions that, when executed, provide a method for controlling the manipulated variable comprising:
   detecting using the detector operably connected to the reaction system to detect a first value of the control variable for the one of a chemical production process and a petroleum refining process different from a set point value at a first point in time;
   calculating a reasonable progress curve value for a second point in time based on the detected first value of the control variable using the processor within the first process controller;
   detecting using one of the detector and the first process controller to detect a second value of the control variable at the second point in time, a difference between the detected second value of the control variable and the set point value being greater than a difference between the reasonable progress curve value for the second point in time and the set point value;
   selecting a first set of operating coefficients for the process controller based on the detected second value of the control variable, the first set of operating coefficients including a first integral coefficient for providing a first weighting for an integral term of the first process controller, wherein the selecting the first set of operating coefficients is performed by the first process controller;
   controlling at least one of the actuator, electrical activator, second process controller, or combination thereof to modify the manipulated variable using the selected first set of operating coefficients;
   detecting, while operating the first process controller using the selected first set of operating conditions, a third value of the control variable different from a set point value at a third point in time, the third point in time being after the first point in time, wherein detecting the third value is performed using one of the detector and the first process controller;
   calculating a reasonable progress curve value for a fourth point in time based on the detected third value of the control variable using the processor within the first process controller;
   detecting a fourth value of the control variable at the fourth point in time, a difference between the detected fourth value of the control variable and the set point value being less than or equal to a difference between the reasonable progress curve value for the fourth point in time and the set point value, wherein detecting the fourth value is performed using one of the detector and the first process controller;
   selecting a second set of operating coefficients for the process controller based on the detected value of the control variable at the fourth point in time, the second set of operating coefficients including a second integral coefficient for providing a second weighting for the integral term of the first process controller, the second weighting being smaller in magnitude than the first weighting, wherein the selecting the second set of operating coefficients is performed by the process controller; and
   controlling at least one of the actuator, electrical activator, second process controller, or combination thereof to modify the manipulated variable using the selected second set of operating coefficients.

16. The system of claim 15, wherein the first process controller comprises a proportional-integral process controller.

17. The system of claim 15, wherein the actuator modifies a position of a valve.

18. The system of claim 15, wherein the electrical activator modifies a duty cycle of a heater.

19. A The system of claim 15, wherein the process controller, comprising:
   a proportional-integral control module for receiving detected values of a control variable and generating a controller output for control of a manipulated variable;
   a curve calculation module for determining a reasonable progress curve based on detected values of the control variable; and
   a coefficient storage module for providing coefficients to the proportional-integral control module based a detected value of the control variable and a reasonable progress curve value.

20. The system of claim 19, wherein the process controller further comprises a set point modification module for providing to the proportional-integral control module a set point for the control variable, one or more error bands for the control variable, or a combination thereof.

* * * * *